United States Patent
Nguyen et al.

(10) Patent No.: US 10,043,487 B2
(45) Date of Patent: Aug. 7, 2018

(54) APPARATUS AND METHOD FOR SPLIT SCREEN DISPLAY ON MOBILE DEVICE

(71) Applicant: Samsung Electronics Co., Ltd., Suwon-si, Gyeonggi-do (KR)

(72) Inventors: Lam Nguyen, Garland, TX (US); Sophie Kim, Houston, TX (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 17 days.

(21) Appl. No.: 14/748,941

(22) Filed: Jun. 24, 2015

(65) Prior Publication Data

US 2016/0379598 A1   Dec. 29, 2016

(51) Int. Cl.
*G09G 5/36* (2006.01)
*H04N 13/00* (2018.01)

(52) U.S. Cl.
CPC ......... *G09G 5/363* (2013.01); *G09G 2320/08* (2013.01); *G09G 2340/0492* (2013.01); *G09G 2340/14* (2013.01); *H04N 13/00* (2013.01)

(58) Field of Classification Search
CPC ........ G06F 2203/04803; G06T 19/006; G02B 27/017; G02B 2027/0178
See application file for complete search history.

(56) References Cited

U.S. PATENT DOCUMENTS

| | | |
|---|---|---|
| 2007/0250867 A1 | 10/2007 | Kuwabara et al. |
| 2008/0278628 A1 | 11/2008 | Hirata et al. |
| 2008/0303747 A1 | 12/2008 | Velicescu |
| 2009/0059073 A1 | 3/2009 | Cho et al. |
| 2010/0079356 A1* | 4/2010 | Hoellwarth .......... G02B 27/017 345/8 |
| 2013/0106923 A1 | 5/2013 | Shields et al. |
| 2013/0162502 A1 | 6/2013 | Lee et al. |
| 2013/0335438 A1 | 12/2013 | Ward |
| 2014/0002478 A1 | 1/2014 | Ballestad et al. |
| 2014/0313143 A1 | 10/2014 | Jung et al. |
| 2015/0074589 A1* | 3/2015 | Pan ..................... G06F 3/04886 715/781 |
| 2015/0117791 A1 | 4/2015 | Mertens et al. |

(Continued)

FOREIGN PATENT DOCUMENTS

| | | |
|---|---|---|
| JP | 2015517250 A | 6/2015 |
| WO | 2015016569 A1 | 2/2015 |

OTHER PUBLICATIONS

International Search Report dated Aug. 24, 2016 in connection with International Application No. PCT/KR2016/005834, 3 pages.

(Continued)

*Primary Examiner* — Jeffrey Chow

(57) ABSTRACT

A method and system is provided for using a split screen mode. The method includes composing a plurality of surfaces into a final surface to display in a display unit of a user equipment. The display unit is operable to display a single screen mode and a split screen mode. The method also includes, responsive to identifying the split screen mode, splitting the display unit into a first screen and a second screen. The method also includes retrieving a set of parameters associated with the split screen mode. The method also includes displaying the final surface in both the first screen and the second screen according to the set of parameters.

14 Claims, 13 Drawing Sheets

(56) References Cited

U.S. PATENT DOCUMENTS

| | | | | |
|---|---|---|---|---|
| 2015/0338915 A1* | 11/2015 | Publicover | ............. | G06F 21/64 |
| | | | | 345/633 |
| 2016/0005349 A1 | 1/2016 | Atkins et al. | | |
| 2016/0011424 A1* | 1/2016 | Thurber | ................ | G02B 27/64 |
| | | | | 345/8 |
| 2016/0019720 A1* | 1/2016 | Thurber | ............. | G02B 27/0172 |
| | | | | 345/419 |
| 2016/0132222 A1* | 5/2016 | Yoo | ....................... | G06F 3/0486 |
| | | | | 715/763 |
| 2018/0063397 A1* | 3/2018 | Sudou | .................... | H04N 5/232 |

OTHER PUBLICATIONS

Written Opinion of the International Searching Authority dated Aug. 24, 2016 in connection with International Application No. PCT/KR2016/005834, 5 pages.

Foreign Communication from a Related Counterpart Application, PCT Application No. PCT/KR2016/010852, International Search Report and Written Opinion dated Jan. 2, 2017, 14 pages.

Supplementary European Search Report dated Apr. 16, 2018 in connection with European Patent Application No. 16 81 4598.

\* cited by examiner

APPARATUS AND METHOD FOR SPLIT SCREEN DISPLAY ON MOBILE DEVICE

TECHNICAL FIELD

The present application relates generally to displaying of screens in user equipment and, more specifically, to a method and apparatus for splitting the screen in a display.

BACKGROUND

With a multitude of binocular video eyewear available in the market, there is a market wide trend of continued efforts for delivering a head mounted display experience. With an increasing number of cameras, smartphone peripherals, and applications for creating and consuming three-dimensional (3D) content, the importance of split screen view as a basic element of 3D viewing is growing. Having a mobile device such as smartphone that is usually used as a handheld as a near-eye viewing display is relatively less appreciated area of virtual or augmented reality experience. Smartphones need to provide the same experience in head-mounted mode as in handheld mode. They need to be able to display views, apps and contents not designed for HMD viewing in a way that makes them useable in a head-mounted, near-eye viewing mode.

SUMMARY

A method is provided for using a split screen mode. The method includes composing a plurality of surfaces into a final surface to display in a display unit of a user equipment. The display unit is operable to display a single screen mode and a split screen mode. The method also includes, responsive to identifying the split screen mode, splitting the display unit into a first screen and a second screen. The method also includes retrieving a set of parameters associated with the split screen mode. The method also includes displaying the final surface in both the first screen and the second screen according to the set of parameters.

A user equipment is provided for using a split screen mode. The user equipment includes a memory element and processing circuitry. The memory element is configured to store a set of parameters associated with a split screen mode. The processing circuitry is coupled to the memory element. The processing circuitry is configured to compose a plurality of surfaces into a final surface to display in a display unit of a user equipment. The display unit is operable to display a single screen mode and a split screen mode. The processing circuitry is also configured to, responsive to identifying the split screen mode, split the display unit into a first screen and a second screen. The processing circuitry is also configured to retrieve a set of parameters associated with the split screen mode. The processing circuitry is also configured to display the final surface in both the first screen and the second screen according to the set of parameters.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the teen "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system and method.

Various embodiments of this disclosure provide a mobile device with a graphics subsystem that includes a screen composer, a display, and at least two display updaters operable in different modes. A first mode employs the first display updater to update the display with the final frame data filling the entire display. A second mode employs the second display updater to send the final frame data twice to side-by-side on-screen positions in accordance with configurable parameters such as display orientation. A change of mode takes place in response to user or app inputs, sensor inputs, system commands, etc. It also utilizes the screen space around and outside the final frame display in the second mode to provide GUI.

Figure 1:
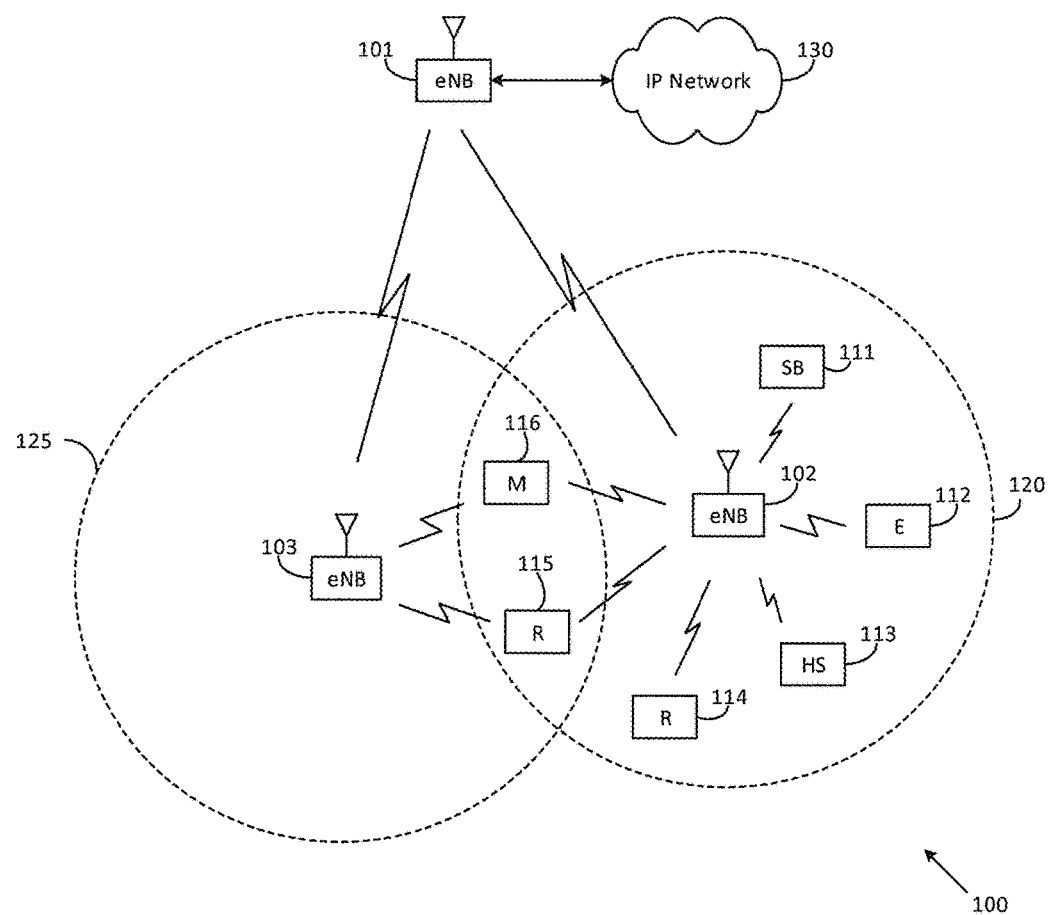
FIG. 1 illustrates an example wireless network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2:
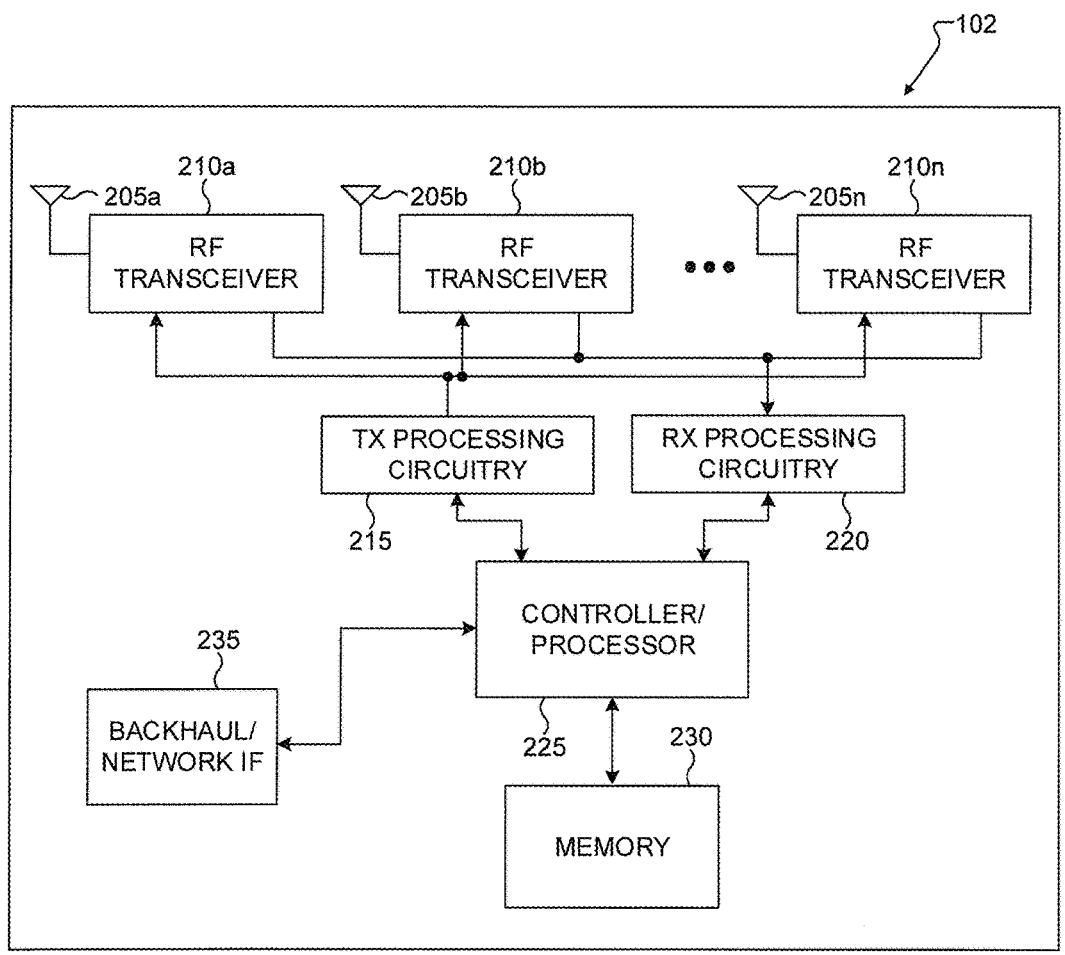
FIG. 2 illustrates an example eNB according to this disclosure.

FIG. 2 illustrates an example eNB 102 according to this disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225. In some embodiments, the controller/processor 225 includes at least one microprocessor or microcontroller.

The controller/processor 225 is also capable of executing programs and other processes resident in the memory 230, such as a basic OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

Figure 3:
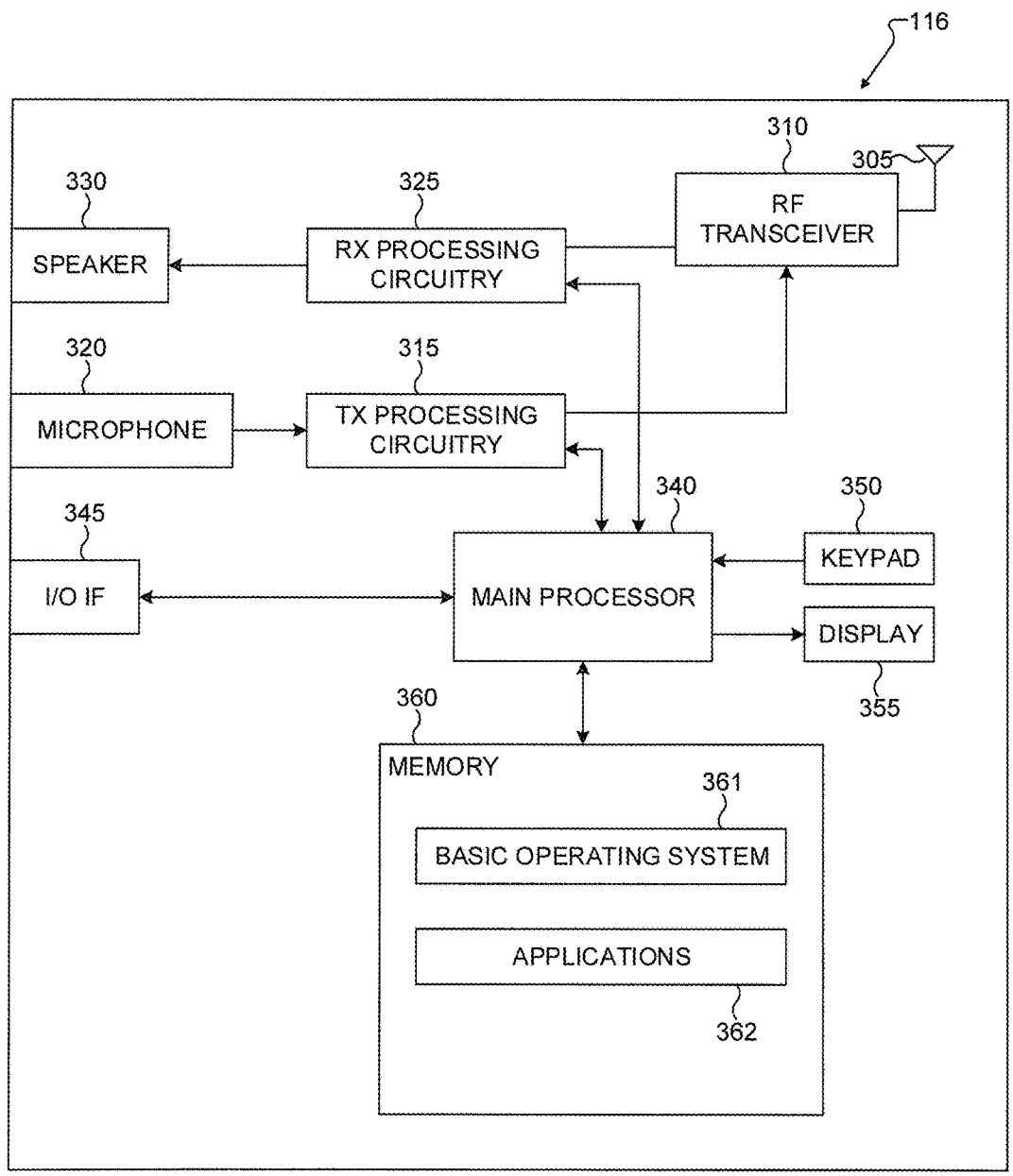
FIG. 3 illustrates an example UE according to this disclosure.

FIG. 3 illustrates an example UE 116 according to this disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362. As used herein, display 355 can also be referred to as a screen. The display 355 can be a touch screen. Additionally, keypad 350 can be part of a touch screen, such as, for example, virtual keypads on a touch screen or virtual buttons. The keypad 350 can also include additional physical buttons on UE 116, such as, for example, a volume button, home screen button, and the like.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the UE 116 with the ability to connect to other devices such as laptop computers and handheld computers. The I/O interface 345 is the communication path between these accessories and the main processor 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

In an embodiment of this disclosure, a mobile device such as smartphone, can be encased by a head-mounted apparatus that is designed to hold it in front of a user's eyes, comprising at least a processor, sensors and controls, a display and first and second display updaters. Another embodiment of this disclosure provides a method to operate the mobile device in different modes employing different components and parameters along with user interfaces for controlling the components and parameters.

Figure 4:
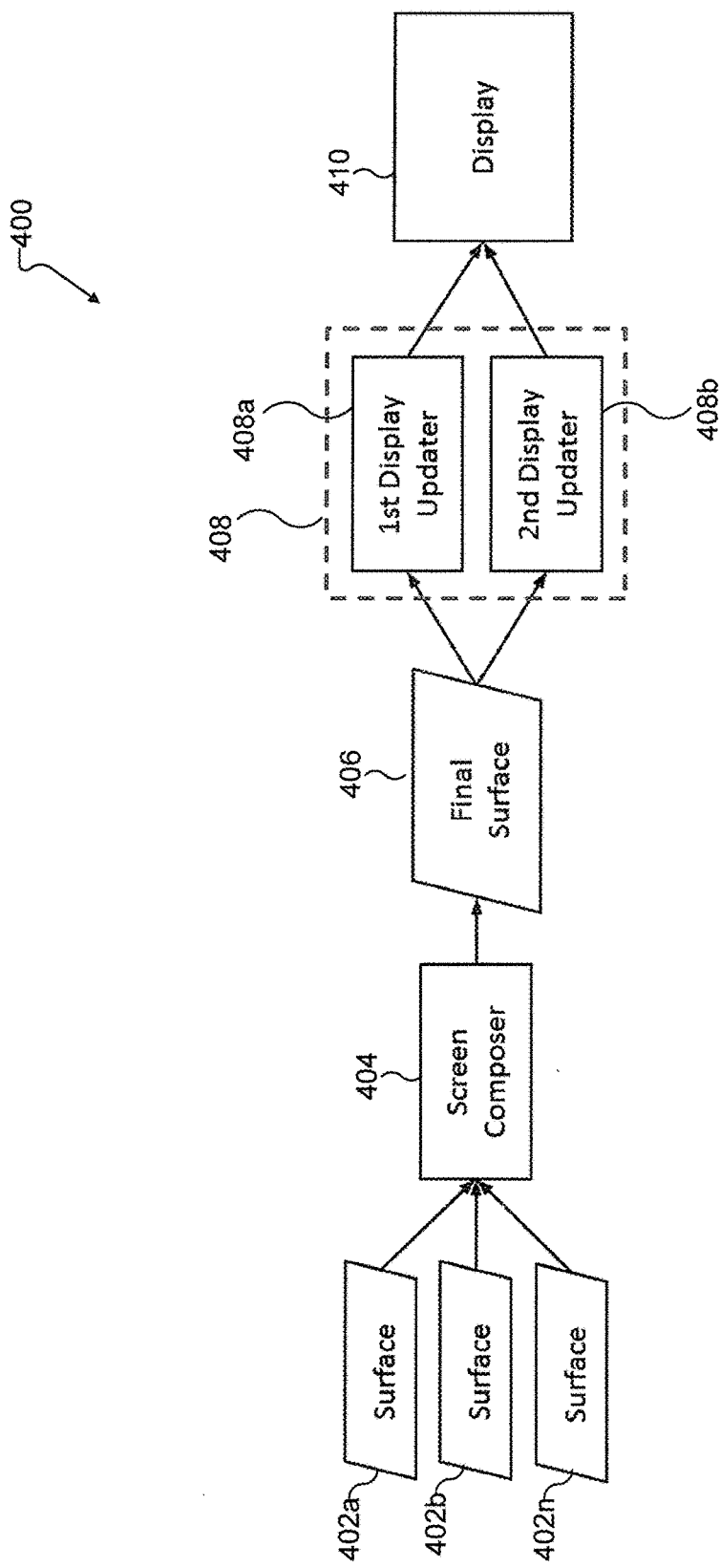
FIG. 4 illustrates a process of a graphics pipeline according to an embodiment of this disclosure.

FIG. 4 illustrates a process of a graphics pipeline 400 according to an embodiment of this disclosure. The embodiment of the graphics pipeline 400 illustrated in FIG. 4 is for illustration only. However, a graphics pipeline can come in a wide variety of configurations, and FIG. 4 does not limit the scope of this disclosure to any particular implementation of a graphics pipeline.

In an embodiment of this disclosure, after applications of a user equipment draw their surfaces 402a-n, a screen composer 440 combines the surfaces 402 into a final surface 406. Surfaces 402 can be different application components of what is displayed on a user equipment. For example, a surface can be a portion of a screen that includes a header, a portion of the screen that includes favorite applications, and the like. In one or more embodiments, the final screen 406 can be a launcher screen. When the final surface 406 is composed, the final surface 406 is sent to a display updater 408.

Various embodiments of this disclosure provide a first display updater 408a and a second display updater 408b. The first display updater 408a displays the final surface 406 once, filling up the entire display 410 of the user equipment and taking into account basic display parameters such as device orientation (rotation), display screen resolution and dimensions, and the like. The second display updater 408b displays the final surface 406 twice on the display 410, resized, oriented, and positioned as per parameters that can be adjusted by the system, the apps or the end users. In one embodiment, the second display updater 408b also incorporates data representing graphical user interface elements that are to be displayed, if enabled by the configuration.

Various embodiments of this disclosure provide different device operation modes. The transition among modes can take place in response to sensor readings of the environment, (when the mobile device detects changes in its position, orientation, proximity to an object, and the like), user inputs (when the end user of the device for any reason wishes to see the display in split screen or in full screen), and inputs from applications (the default viewing mode for a view of an app, and the like).

Various embodiments of this disclosure provide a first operation mode that employs the first display updater 408a, and a second operation mode that employs the second display updater 408b. The first operation mode can also be referred to as a single screen mode and the second operation mode can be referred to as a split screen mode. The first operation mode can handle the display, for example, when the mobile device is handheld. The second operation mode can handle a split view display for example when the device is encased in the head-mounted apparatus or any other use. Additionally, customized modes could be set up for different user or environment profiles. Each time a change of an operation mode occurs, the system can retrieve a set of parameters to configure the operation mode appropriately. Each operation mode can include a set of parameters.

Figure 5:
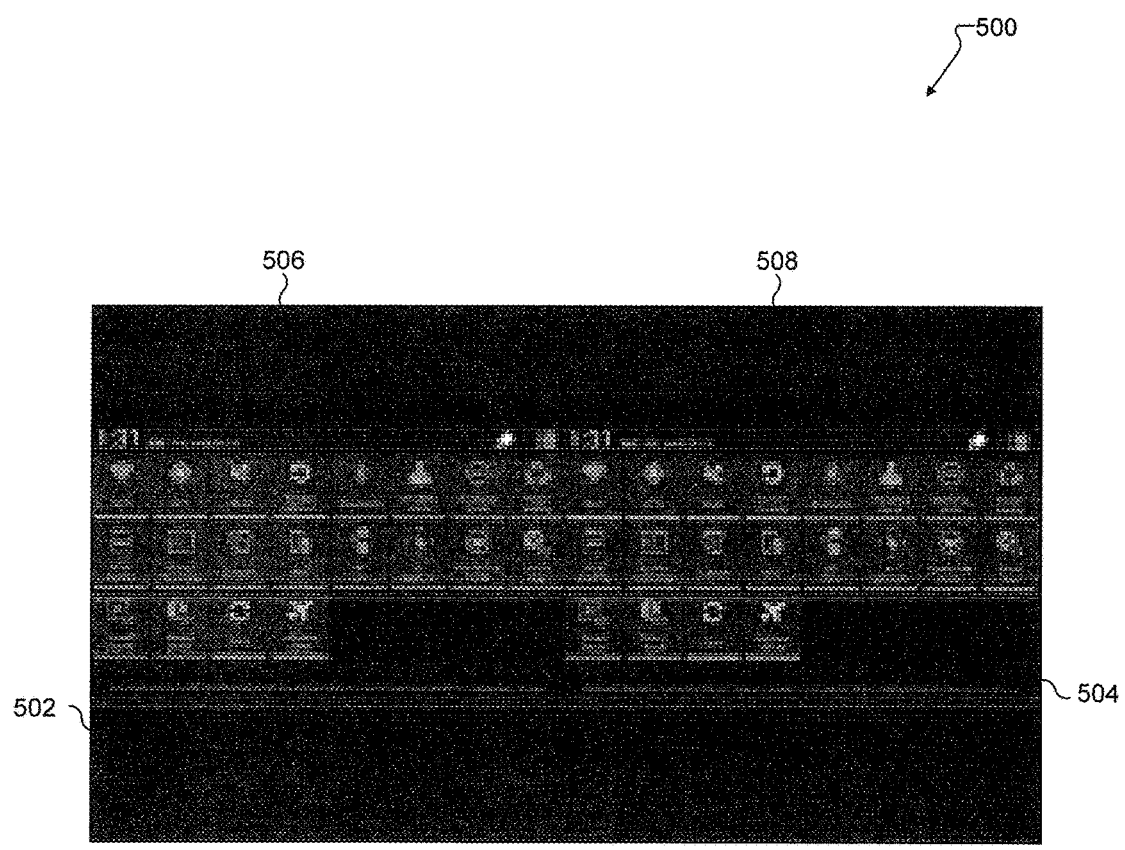
FIG. 5 illustrates an example of a landscape orientation split screen according to an embodiment of this disclosure.

FIG. 5 illustrates an example of a landscape orientation split screen according to an embodiment of this disclosure. The embodiment of the split screen illustrated in FIG. 5 is for illustration only. However, a split screen can come in a wide variety of configurations, and FIG. 5 does not limit the scope of this disclosure to any particular implementation of a split screen.

In an embodiment, one of the set of parameters is an orientation parameter. When the mode changes to the split screen mode to accommodate a head-mounted environment, the system retrieves the desired display orientation. For example, the desired display orientation in the split screen mode can be set to be the same as the display orientation at the time of the mode change.

In FIG. 5, a display 500 includes a top 502 and a bottom 504. In relation to a user equipment, the top 502 is near the upward end of the user equipment where a speaker for a communication is located. The bottom 504 is near the downward end of the user equipment where a microphone for a communication is located. During split screen mode, a first screen 506 and a second screen 508 are displayed. The first screen 506 and the second screen 508 are displayed in display 500 in landscape mode, while the final surface in each of the screens 506 and 508 in portrait mode. In single screen mode, the final surface may have been displayed in landscape mode, while in split screen mode, the final surface is displayed in portrait mode for better viewing.

The split screen mode can also be configured such that each application sets what orientation the display should take by default or in the head-mounted mode, with the natural device orientation assigned to any launcher activity or application by default. When the mode changes, the system retrieves the display orientation of the active application at the time, and the display is handled by the split screen mode in accordance with the retrieved information.

The display orientation in the split screen mode might also be adjusted in response to the user input entered via an assigned user interface, which could be motion gesture, graphical user interface (GUI) on the display, external controller, and the like. The display orientation information might also include a Boolean that disables updating the orientation once the desired orientation is set.

Figure 6:
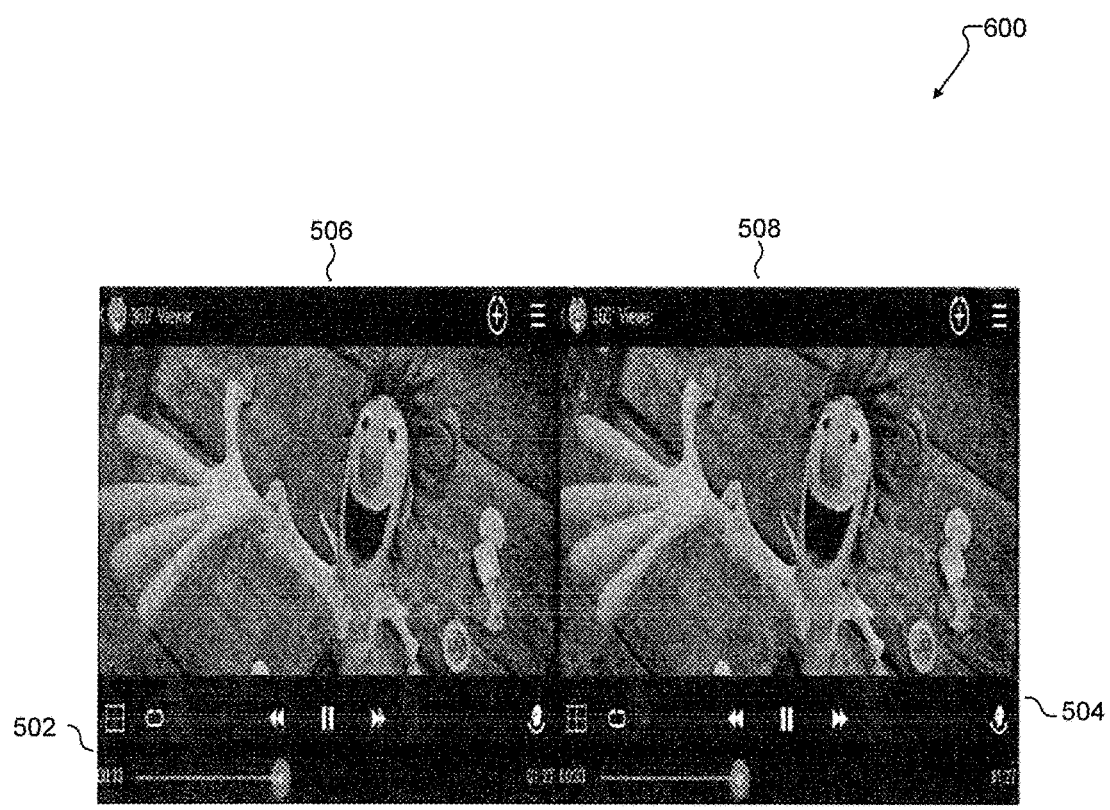
FIG. 6 illustrates an example of a default viewing mode according to an embodiment of this disclosure.

FIG. 6 illustrates an example of a default viewing mode according to an embodiment of this disclosure. The embodiment of default viewing mode illustrated in FIG. 6 is for illustration only. However, a default viewing mode can come in a wide variety of configurations, and FIG. 6 does not limit the scope of this disclosure to any particular implementation of a default viewing mode.

The default viewing mode can be set at various levels, for example, an operating system (OS) level, application level, activity level, view level, and the like. For example, if an activity of a 3D media player sets its default viewing mode as split screen view, even if the mode at the time of launching the activity is single screen mode, upon the beginning of the activity the mode would switch to split screen mode. In FIG. 6, display 600 shows a 3D video. Because 3D video already splits a screen, the system can set a default mode to single screen mode to prevent four feeds of the 3D video. Each of a first screen 506 and second screen 508 show a single video feed with a set of controls to create a 3D effect of the video. As used herein in any of the different embodiments, the two screens can be slightly different for the 3D effect, but the images on each screen are the same.

Figure 7A:
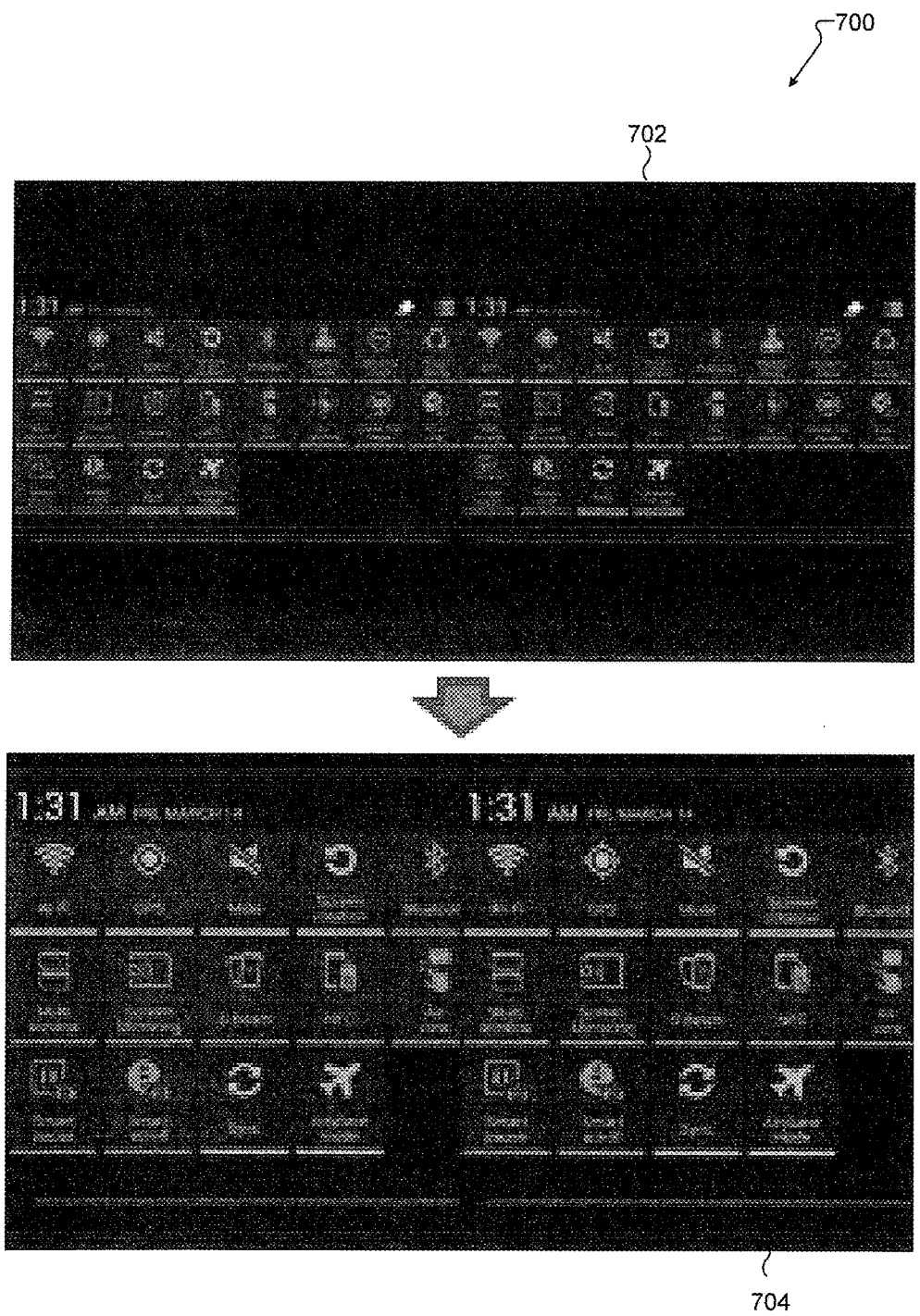
FIGS. 7A and 7B illustrate examples of a screen size adjustment according to embodiments of this disclosure.
Figure 7B:
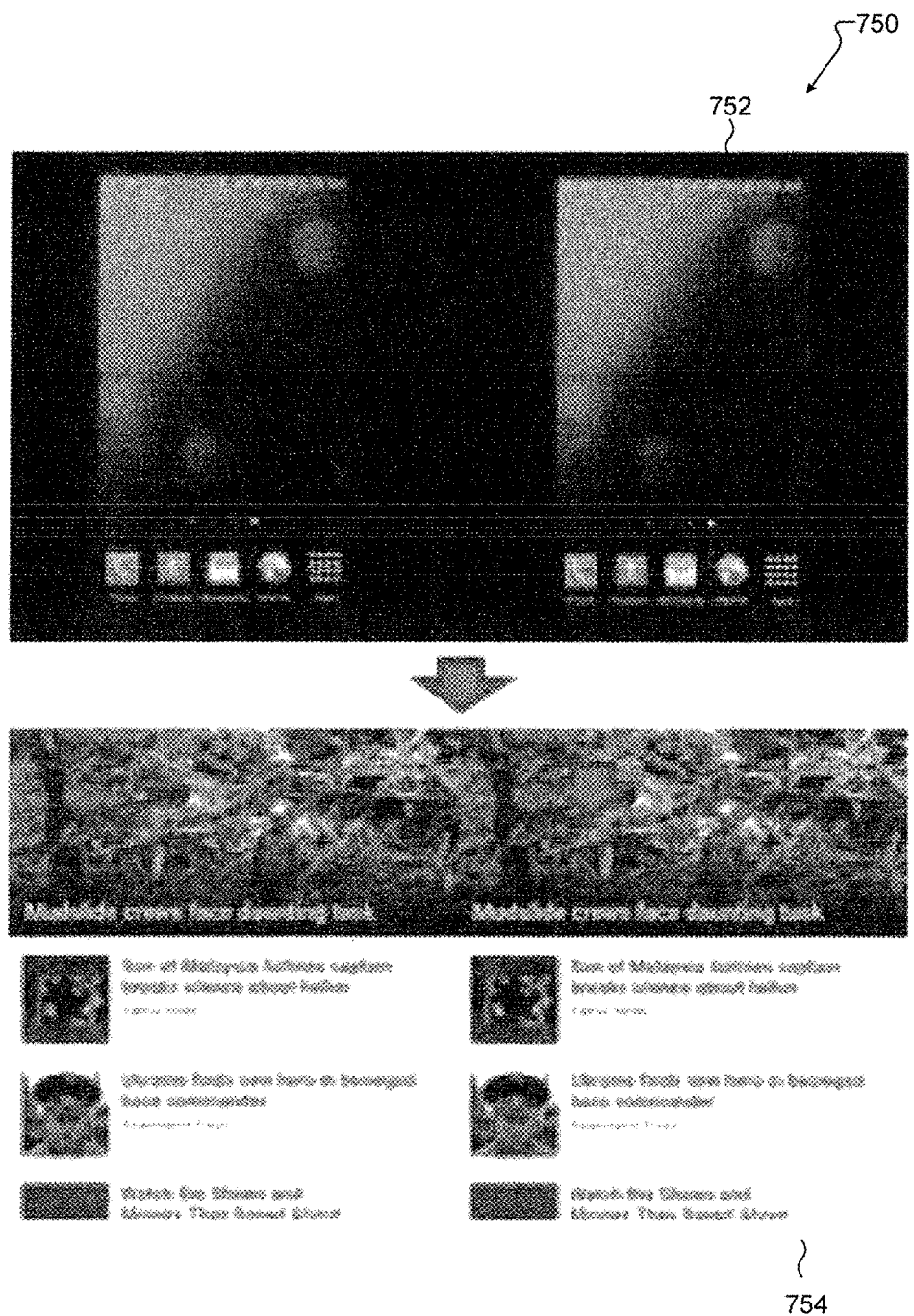

FIGS. 7A and 7B illustrate examples of a screen size adjustment according to embodiments of this disclosure. The embodiment of the screen size adjustment illustrated in FIGS. 7A and 7B is for illustration only. However, a screen size adjustment can come in a wide variety of configurations, and FIGS. 7A and 7B does not limit the scope of this disclosure to any particular implementation of a screen size adjustment.

The size that the final surface can be resized to in the split screen mode can be set by default by the system to be appropriate for near-eye viewing of the head-mounted apparatus, and can be adjusted at various levels or by the end users. For example, in FIG. 7A, the end user can zoom in/out the content using assigned UI as with the pinch-to-zoom gesture on the display 700 in the handheld mode. Also, for example, in FIG. 7B, applications may adjust the size of the final surface display to an appropriate size for its purpose. Some applications might configure their content to occupy the entire halves of the display, and set the size accordingly. In one example embodiment, display 752 shows the first and second screens occupying only a portion of each halve of the display, while display 754 shows the first and second screens occupying entire halves of the display.

Figure 8:
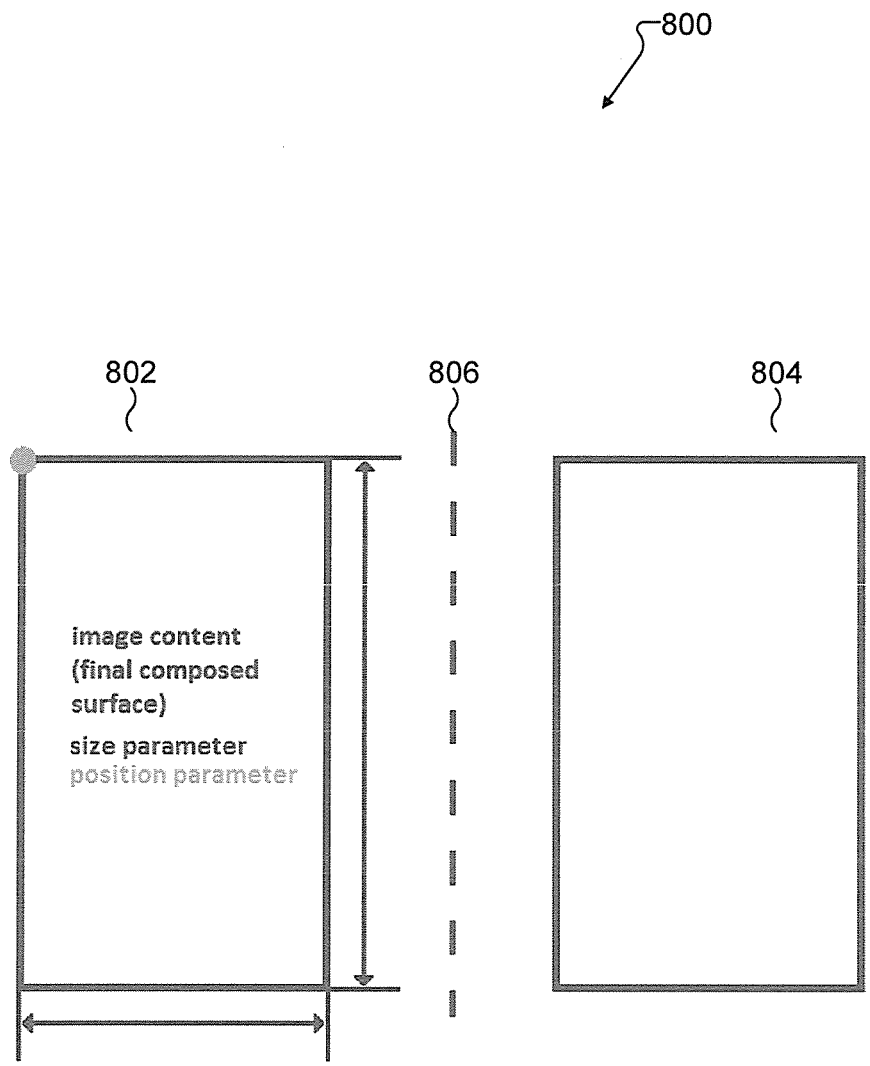
FIG. 8 illustrates an example of screen position according to an embodiment of this disclosure.

FIG. 8 illustrates an example of screen position according to an embodiment of this disclosure. The embodiment of the screen position illustrated in FIG. 8 is for illustration only. However, a screen position can come in a wide variety of configurations, and FIG. 8 does not limit the scope of this disclosure to any particular implementation of a screen position.

The position on the display screen where the final surface would be displayed in the split screen mode is set by default by the system to be appropriate for near-eye viewing of the head-mounted apparatus, and can be adjusted at various levels or by the end users. For example, apps may adjust the screen positions of the final surface content to configure its own composition of split screen view.

In FIG. 8, a display 800 includes a first halve 802 with a first screen and a second halve 804 with a second screen separated by a divider 806. Each screen within each halve can be set by a size parameter and a position parameter. These parameters can be set to give optimal near-eye viewing in a head-mounted apparatus for a user.

Figure 9:
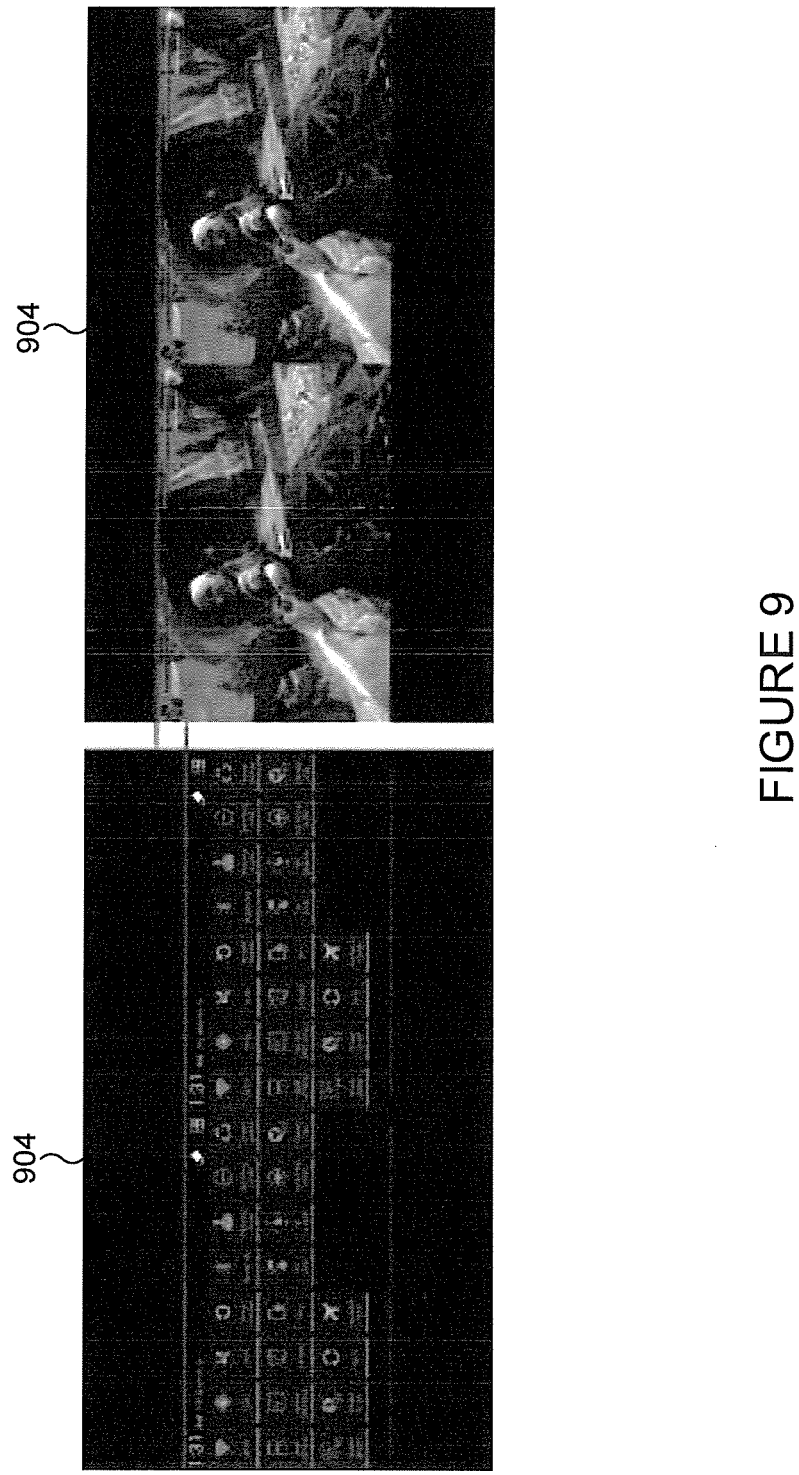
FIG. 9 illustrates an example of screen height positioning according to an embodiment of this disclosure.

FIG. 9 illustrates an example of screen height positioning according to an embodiment of this disclosure. The embodiment of the screen height positioning illustrated in FIG. 9 is for illustration only. However, screen height positioning can come in a wide variety of configurations, and FIG. 9 does not limit the scope of this disclosure to any particular implementation of screen height positioning.

In FIG. 9, display 902 shows a launcher page, while display 904 shows a game. The system may choose to increase the height of the content in display 904 when in the split screen (HMD) mode so that the interface at the top of the screen does not block the user's effective field of view. The system might set the position of the content in display 905 in the split screen mode higher than the default position set for launcher pages of display 904 to accommodate the increased height.

Figure 10:
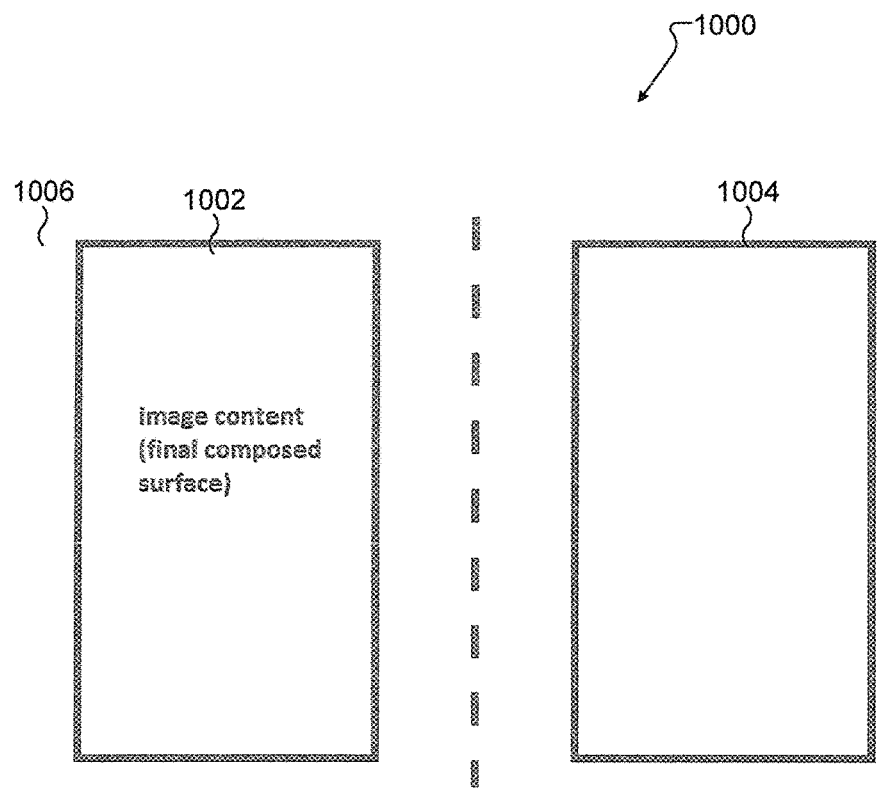
FIG. 10 illustrates an example of screen size yielding negative space according to an embodiment of this disclosure.

FIG. 10 illustrates an example of screen size yielding negative space according to an embodiment of this disclosure. The embodiment of the negative space illustrated in FIG. 10 is for illustration only. However, negative space can come in a wide variety of configurations, and FIG. 10 does not limit the scope of this disclosure to any particular implementation of negative space.

In FIG. 10, in the split screen mode, the content to be displayed in each of the split view areas, first screen 1002 and second screen 1004, might be smaller than the area yielding a negative space 1006. In an embodiment, the processor renders graphical user interface items, per configuration set by system, applications or the end user, and incorporates them into the negative space of the screen area to be interacted with by the end user.

Figure 11:
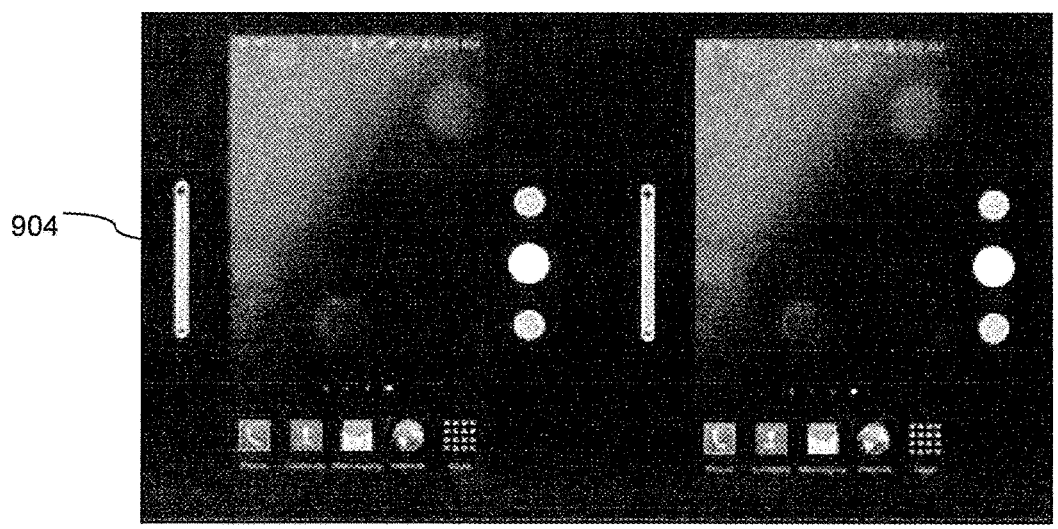
FIG. 11 illustrates an example of control elements in negative space according to an embodiment of this disclosure.

FIG. 11 illustrates an example of control elements in negative space according to an embodiment of this disclosure. The embodiment of the control elements illustrated in FIG. 11 is for illustration only. However, control elements can come in a wide variety of configurations, and FIG. 11 does not limit the scope of this disclosure to any particular implementation of control elements.

In an embodiment of this disclosure, display 1100 provides an example implementation of GUI elements in the negative space in the split screen mode. The button on the left of the surface content represents the volume key and the three buttons on the right of the content represent the home key and two soft keys of a user equipment. The keys and buttons could be hidden and not displayed while the focal point or user focus (by cursor or eye tracking) is inside the content area, and become visible once the focal point or user focus is outside the first and second screens and moving into the negative space. The user can move the focal point or user focus to hover over these elements and interact with them similar to physical controls on the device. The focal point can be a current cursor location or eye tracking location on the display device. In an example embodiment, when the focal point is an eye tracking location, the focal point can be a location of display device where a user's eyes are focused.

In one embodiment of this disclosure, a GUI can be displayed when there is negative screen space around the surface content, the surface content being smaller than the half of the screen area. Even when enabled, the GUI display might be hidden for usability. For example, the GUI display might stay hidden while the user focus is within the surface content area. It would become visible only when the focus moves outside of the surface content area and into the negative space. When the first and second screens completely fill the display, the GUI control elements can be disabled.

Figure 12:
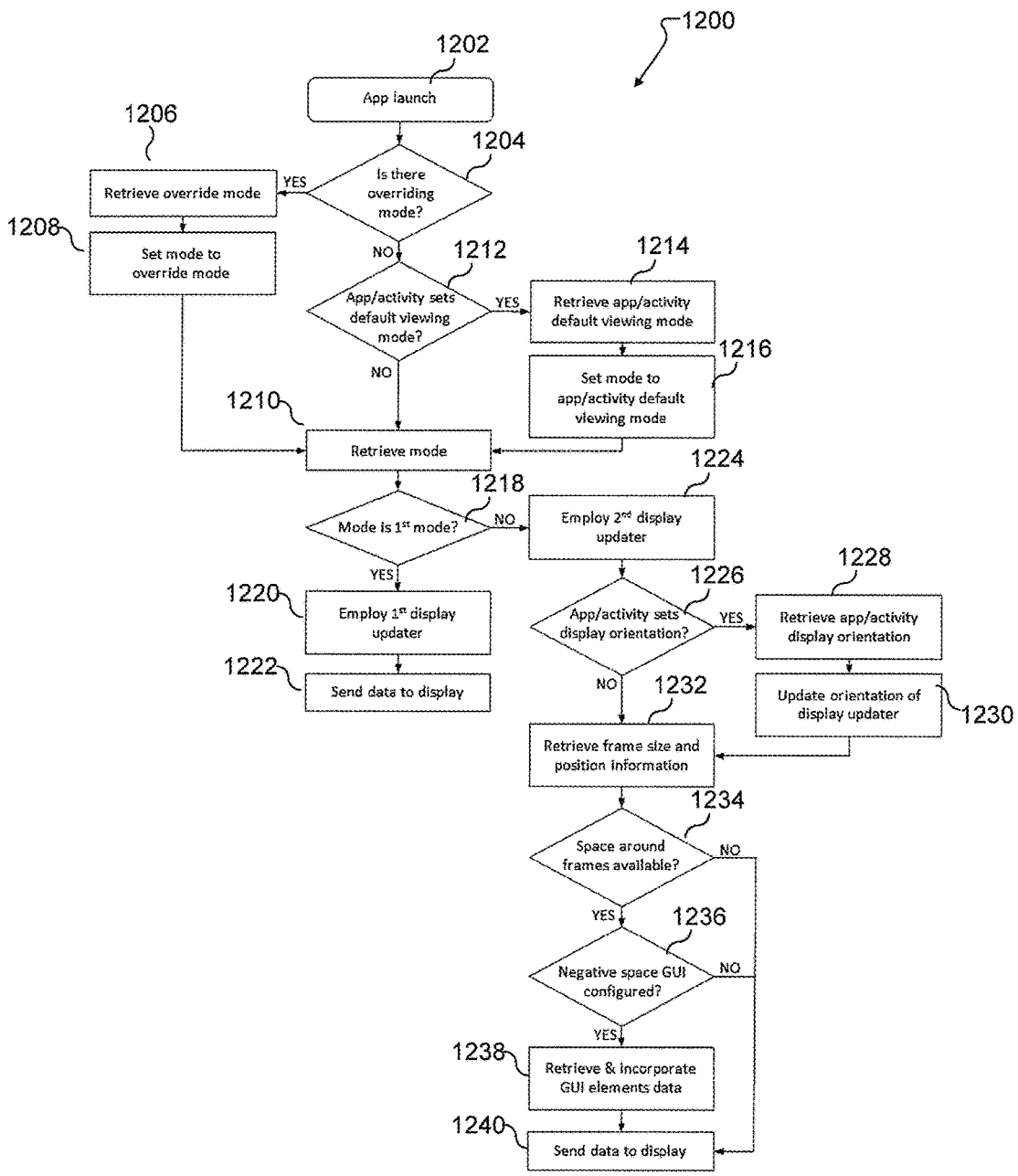
FIG. 12 illustrates a process for displaying single screen and split screen modes according to an embodiment of this disclosure.

FIG. 12 illustrates a process 1200 for displaying single screen and split screen modes according to an embodiment of this disclosure. The embodiment of the process 1200 illustrated in FIG. 12 is for illustration only. However, process 1200 can come in a wide variety of configurations, and FIG. 12 does not limit the scope of this disclosure to any particular implementation of process 1200. Process 1200 can be implemented by a number of devices or elements described herein. For example, process 1200 can be implemented by a controller, processor, or processing circuitry.

At operation 1202, an application launches. At operation 1204, the processor determines whether there is an overriding mode. If there is an overriding mode, at operation 1206, the processor retrieves the overriding mode. At operation 1208, the processor sets the mode to the override mode. For example, if the override mode is a single screen mode, the processor sets the mode to single screen mode.

If, at operation 1204, there is no override mode, then at operation 1212, the processor determines if the application or activity has a default viewing mode. If there is a default viewing mode, then at operation 1214, the processor retrieves the application or activity viewing mode. At operation 1216, the processor sets the mode to the default viewing mode. At operation 1210, the processor retrieves the set viewing mode.

At operation 1218, the processor determines whether the retrieved viewing mode is a first operating mode. In one embodiment, the first operating mode is a single screen mode. If the mode is the first operating mode, at operation 1220, the processor employs the first display updater. Then at operation 1222, the processor sends the data for the first operation mode to the display.

If at operation 1218, the mode is a second operation mode, at operation 1224, the processor employs a second display updater. At operation 1226, the processor determines whether the application or activity sets a display orientation. If the application or activity sets the display orientation, at operation 1228, the processor retrieves the application or activity display orientation. Then at operation 1230, the processor updates the orientation of the display updater. If at operation 1226, the application or activity does not set the orientation, at operation 1232, the processor retrieves the frame size and position information.

At operation 1234, the processor determines whether there is negative space available around the screens (also referred to as frames). If there is no negative space, at operation 1240, the processor sends data to the display. If there is negative space, then at operation 1236, the processor determines whether a negative space GUI is configured with control elements. If the GUI is not configured, then at operation 1240, the processor sends the data to the display. If the GUI is configured, then at operation 1238, the processor retrieves and incorporates the GUI elements. Then at operation 1240, the processor sends data to the display.

Figure 13:
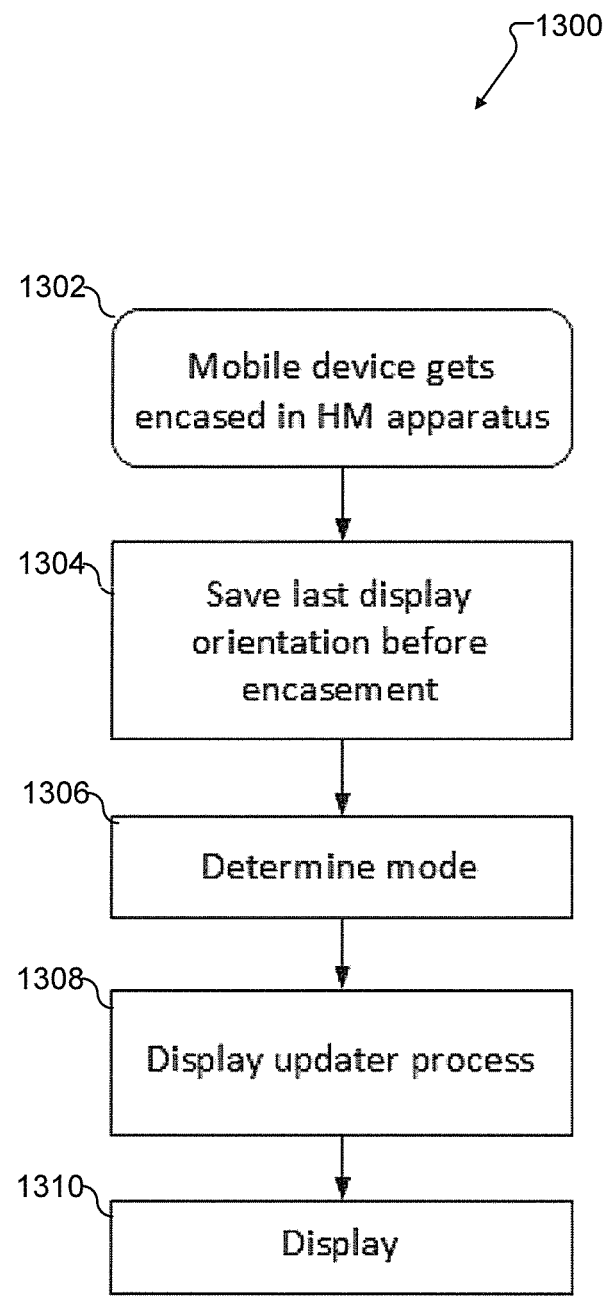
FIG. 13 illustrates a process for displaying single screen and split screen modes according to an embodiment of this disclosure.

FIG. 13 illustrates a process 1300 for displaying single screen and split screen modes according to an embodiment of this disclosure. The embodiment of the process 1300 illustrated in FIG. 13 is for illustration only. However, process 1300 can come in a wide variety of configurations, and FIG. 13 does not limit the scope of this disclosure to any particular implementation of process 1300. Process 1300 can be implemented by a number of devices or elements described herein. For example, process 1300 can be implemented by a controller, processor, or processing circuitry.

At operation 1302, a mobile device may be encased in a head-mounted apparatus. At operation 1304, a processor saves the last display orientation before encasement. At operation 1306, the processor determines an operating mode. At operation 1308, the processor controls the display updater process. At operation 1310, the processor controls a display unit to display the result of the display updater process. The display updater process is a process to select a display updater and configure the parameters of the operating mode.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for providing a split screen in a mobile device coupled to a head mounted display (HMD), the method comprising:
   composing a plurality of surfaces into a final surface to display in a display unit of a user equipment, wherein the display unit is operable to display a single screen mode and a split screen mode;
   responsive to identifying the split screen mode, splitting the display unit into a first screen and a second screen, wherein the first screen is positioned to a right or left side of the second screen when the display unit is landscape oriented;
   retrieving a set of parameters associated with the split screen mode; and
   displaying the final surface twice on the display unit in the split screen mode, wherein in the split screen mode the final surface is displayed in a portrait orientation in both the first screen and the second screen according to the set of parameters, wherein the set of parameters includes an adjustable size and position of the final surface of the first screen and second screen, such that when an area of the first and second screens is less than an area of the display unit, a remaining area of the area of the display unit is a negative space that includes at least one control element and wherein in the single screen mode, the final surface is displayed once by the display unit.

2. The method of claim 1, wherein retrieving a set of parameters associated with the split screen mode further comprises:
   identifying an executed application;
   retrieving a default mode for the executed application; and
   displaying the final surface within the first screen and the second screen according to the default mode.

3. The method of claim 1, wherein the set of parameters includes an orientation parameter, and wherein the orientation parameter sets the final surface within the first and second screen to the portrait orientation matching an orientation of the display unit prior to split screen mode.

4. The method of claim 1, wherein the final surface comprises three-dimensional (3D) video information and each of the first screen and the second screen are configured to display the final surface with a 3D effect.

5. The method of claim 1, wherein the at least one control element performs a function corresponding to a function of a physical button of the user equipment.

6. The method of claim 1, wherein the at least one control element is hidden when a focal point is on the first screen or the second screen, and wherein the at least one control element is visible when the focal point is on the negative space.

7. The method of claim 2, wherein the default mode is an override mode, displaying the final surface within the first screen and the second screen according to the default mode comprises displaying the final surface within the first screen and the second screen according to the single screen mode.

8. A user equipment, comprising:
   a memory element configured to store a set of parameters associated with a split screen mode;
   a display unit configured to display one or more images in a single screen mode or in the split screen mode, the split screen mode having a first screen and a second screen positioned to a right or left side of the first screen when the display unit is landscape oriented; and
   processing circuitry coupled to the memory element, the processing circuitry configured to:
   compose a plurality of surfaces into a final surface to display in the display unit;
   display the final surface once in the single screen mode;
   responsive to identifying the split screen mode, split the display unit into the first screen and the second screen;
   retrieve a set of parameters associated with the split screen mode; and
   display the final surface in a portrait orientation in both the first screen and the second screen according to the set of parameters, wherein the set of parameters includes size and position of the final surface in each of the first screen and second screen, and wherein when an area of the first and second screens is less than an area of the display unit, a remaining area of the area of the display unit is a negative space that includes at least one control element.

9. The user equipment of claim 8, wherein retrieving a set of parameters associated with the split screen mode further comprises the processing circuitry configured to:
   identify an executed application;
   retrieve a default mode for the executed application; and
   display the final surface within the first screen and the second screen according to the default mode.

10. The user equipment of claim 8, wherein the set of parameters includes an orientation parameter, and wherein the orientation parameter sets the final surface within the first and second screen to the portrait orientation matching an orientation of the display unit prior to split screen mode.

11. The user equipment of claim 8, wherein the final surface comprises three-dimensional (3D) video information and each of the first screen and the second screen are configured to display the final surface with a 3D effect.

12. The user equipment of claim 8 wherein the at least one control element performs a function corresponding to a function of a physical button of the user equipment.

13. The user equipment of claim 8 wherein the at least one control element is hidden when a focal point is on the first screen or the second screen, and wherein the at least one control element is visible when the focal point is on the negative space.

14. The user equipment of claim 9, wherein the default mode is an override mode, and wherein displaying the final surface within the first screen and the second screen according to the default mode comprises the processing circuitry configured to displaying the final surface within the first screen and the second screen according to the single screen mode.

* * * * *